Feb. 8, 1944.  R. S. BOHANNAN  2,341,173
WEIGHING SCALE
Filed July 3, 1941  2 Sheets-Sheet 1
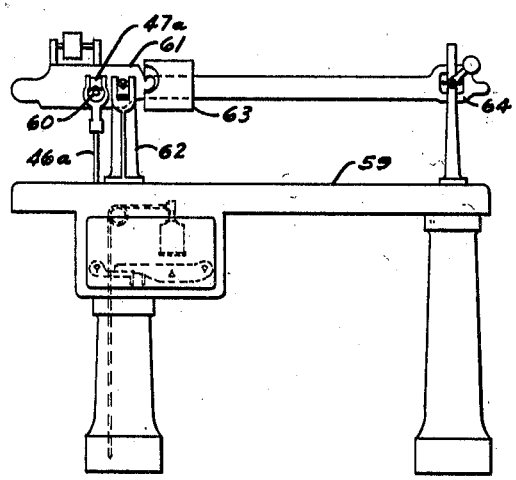
Fig. III
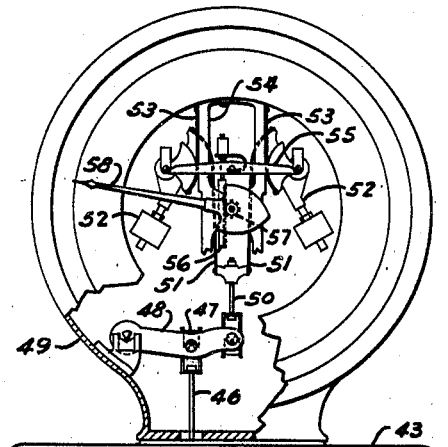
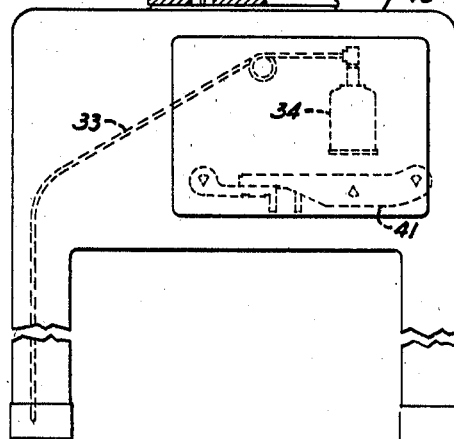
Fig. II
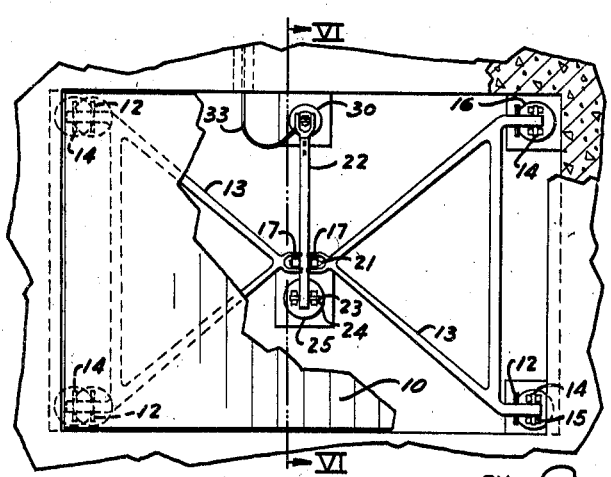
Fig. I
Robert S. Bohannan
INVENTOR
BY Marshall and Marshall
ATTORNEYS Feb. 8, 1944.    R. S. BOHANNAN    2,341,173
WEIGHING SCALE
Filed July 3, 1941    2 Sheets-Sheet 2
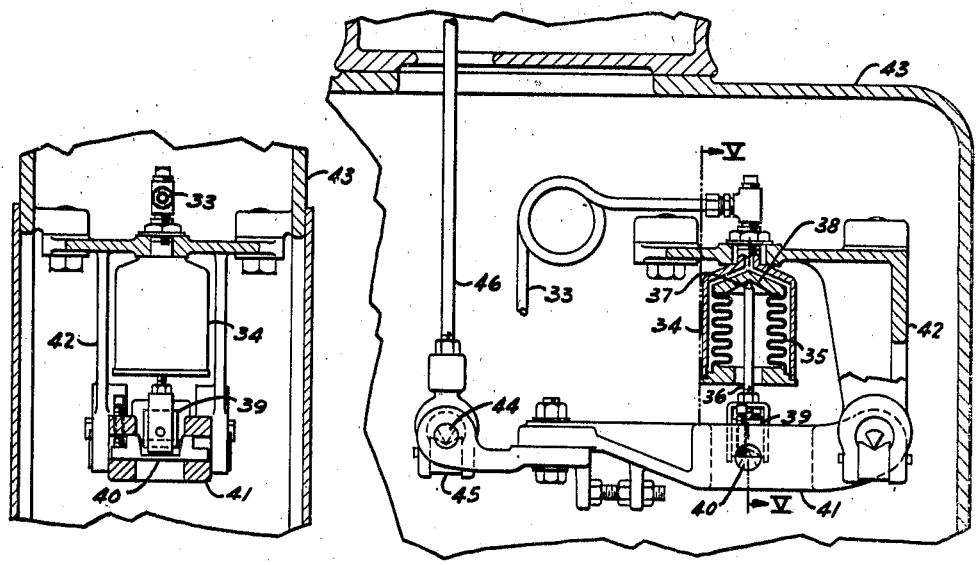
Fig. V    Fig. IV
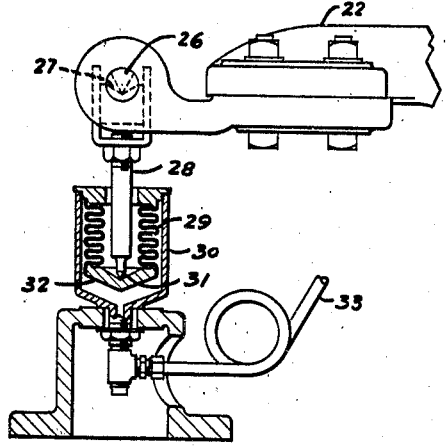
Fig. VII
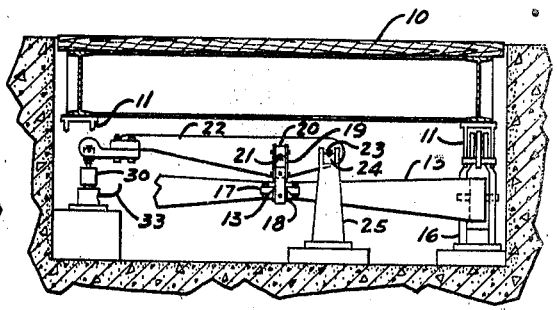
Fig. VI
Robert S. Bohannan
INVENTOR
BY Marshall & Marshall
ATTORNEYS Patented Feb. 8, 1944

2,341,173

UNITED STATES PATENT OFFICE 2,341,173

WEIGHING SCALE

Robert S. Bohannan, Toledo, Ohio, assignor to Toledo Scale Company, Toledo, Ohio, a corporation of New Jersey Application July 3, 1941, Serial No. 400,989

4 Claims. (Cl. 265—47)

This invention relates to weighing scales, and more particularly to means for transmitting force from the load receiver of a weighing scale and its lever system to load counterbalancing and indicating mechanism, when the load counterbalancing and indicating mechanism is located at a distance from the load receiver.

When it is desired to locate the head of a scale at some distance from the platform or load receiver, it is necessary to use some type of extension means to transmit the force from the lever system to the load counterbalancing means. It has been the practice to employ extension levers to achieve this purpose. This practice, however, was not satisfactory under all circumstances because of the expense of such extension levers and due to the fact that the distances which could be covered and the directions through which the force could be transmitted were limited by the number of levers which could reasonably be employed. For example, for each corner which had to be turned, a new lever had to be employed and for each rise in level, a connecting link had to be put into the system to connect a lever on a lower level to one on an upper level.

Other difficulties are encountered in the use of extension levers when passageways for such levers must be separately constructed to protect the levers and their connections and, at the same time, the levers must be kept easily accessible to permit them to be repaired and adjusted. Friction generated in transmitting motion through a chain of such extension levers is one factor which may lower the accuracy of the weighing scale.

It is an object of this invention to provide extension means for transmitting force from platform supporting levers to load counterbalancing means without the use of a plurality of extension levers.

It is a further object of this invention to provide such an extension force transmitting means capable of being led in various directions and through labyrinthine passageways with multiple corners and lying at different levels.

It is a further object of this invention to provide such extension force transmitting means which do not require carefully located and protected passageways to permit them to be installed.

It is still another object of this invention to provide an extension force transmitting means which will not impair the accuracy of the scale regardless of the number of corners to be turned or the different levels on which the load receiver and load counterbalancing means may be located.

More specific objects and advantages are apparent from the description, in which reference is had to the accompanying drawings illustrating a preferred form of scale embodying the invention.

In the drawings:

Fig. I is a plan view of a platform of a scale embodying the invention, the platform deck being broken away to more clearly show the lever system.

Fig. II is a view in front elevation of the automatic load counterbalancing mechanism of a scale including an embodiment of the invention, showing its connection therewith.

Fig. III is a view in front elevation, on a smaller scale of a beam type weight counterbalancing mechanism of a scale including an embodiment of the invention.

Fig. IV is a fragmentary view in elevation of an enlarged scale of the pressure responsive elements of an embodiment of the invention adaptable to either of the weight counterbalancing mechanisms shown in Figures II and III.

Fig. V is a vertical sectional view taken on the line V—V of Fig. IV.

Fig. VI is a view in vertical elevation taken on the line VI—VI of Fig. I.

Fig. VII is a greatly enlarged fragmentary detailed view of the pressure creating portion of an embodiment of the invention.

These specific drawings and the specific description that follows merely disclose and illustrate the invention and are not intended to impose limitations upon the claims.

A load receiving platform 10 (Figures I and VI) is supported, by means of parallel links 11, upon load pivots 12 of main levers 13. The main levers 13 are fulcrumed on pivots 14 supported by bearings 15 located in fulcrum stands 16. The main levers 13 have nose pivots 17 which are supported by bearings 18 (Fig. VI) held in the lower portion of a link 19.

The link 19 has, mounted in its upper ends, bearings 20 which rest on a load pivot 21 of a gathering lever 22. The gathering lever 22 is fulcrumed on a pivot 23 in a bearing 24, supported by a fulcrum stand 25. The nose of the lever 22 (Fig. VII) has mounted therein a pivot 26 which rests on a bearing 27 held in the upper end of a vertical strut 28. The strut 28 extends downwardly through the open up-turned end of a metallic bellows 29 which is mounted within a chamber 30. The lower end of the strut 28 is turned into a point pivot 31 which rests in a cone-shaped end 32 of the bellows 29. The bellows 29 is normally contracted when there is no load on the platform 10.

The space between the outer wall of the bellows 29 and the inner wall of the chamber 30 is in communication with a pipe 33. The pipe 33 transmits the pressure created within liquid confined in the chamber 30 and the pipe 33 to the head of the scale (Fig. IV) where the pipe 33 is in communication with the interior of a chamber 34. The chamber 34 has mounted therein a vertically disposed metallic bellows 35, substantially identical in size with the bellows 29.

A strut 36 extends upwardly through the open lower end of the chamber 34 and the bellows 35, and has a point pivot 37 on its upper end which bears on the center of a cone-shaped upper end 38 of the bellows 35. Attached to the lower end of the strut 36 is a clevis-held bearing 39, which rests on a load pivot 40 of a horizontally disposed shelf lever 41.

The shelf lever 41 is fulcrumed in a bracket 42 fastened to a housing 43. A nose pivot 44, of the shelf lever 41, rests in a bearing 45 held in the lower end of a vertical pull rod 46.

The pull rod 46 (Fig. II) extends upwardly through an opening in the housing 43 and has a bearing 47 which rests on the load pivot of a pendulum lever 48 mounted within a dial housing 49. The pendulum lever 48 is connected, by means of a link 50 and metallic ribbons 51, to load counterbalancing pendulums 52 which are supported by metallic ribbons 53 mounted on a subframe 54. The pendulums 52 are connected by means of a compensating bar 55, a rack 56 and a pinion 57 to the shaft on which an indicator 58 is affixed. The indicator 58 sweeps over a dial to show the amount of weight placed on the load receiver.

Fig. III illustrates an embodiment of the invention attached to a beam type weighing scale. The vertical pull rod 46a extends upwardly through a beam stand 59 and carries a bearing 47a in its upper end which rests on a load pivot 60 of a beam 61 fulcrumed on a bracket 62 supported by the beam stand 59. The beam 61 has a poise 63 longitudinally slidable thereon to counterbalance the weight placed upon the load receiver and a trig and locking loop 64 to indicate when the scale is in balance.

The force created by a load placed upon the platform 10 is transmitted through levers 13 and 22 and the strut 28 to the bellows 29 which thereby is expanded and which creates a pressure in the liquid confined within the chamber 30, pipe 33 and chamber 34. The pressure thus created compresses the bellows 35 and is transmitted through the strut 36, the shelf lever 41, and the pull rod 46 to the load counterbalancing means.

The pipe 33 may be of any desired length, and have any number of turns therein, since the pressure created within the liquid is transmitted throughout its entire volume with the same intensity and will be transmitted through a lengthy pipe as easily as through a short one. Thus, the relative locations of the platform 10 and the load counterbalancing means may be varied at will and are practically unlimited.

The embodiment of the invention that has been disclosed may be modified to meet various requirements.

Having described the invention, I claim:

1. In a weighing scale, in combination, a load receiver, a lever system supporting said load receiver, load counterbalancing means and a hydraulic system, said hydraulic system comprising a metallic bellows mounted within a chamber, the open end of said bellows coinciding with the open end of said chamber, means for applying force from said lever system to said bellows, a second metallic bellows similarly mounted within a second chamber, said second chamber being in communication with said first chamber, and means acted on by said second bellows for applying force to said load counterbalancing means.

2. In a weighing scale, in combination, a load receiver, a lever system supporting said load receiver, load counterbalancing means and a hydraulic system, said hydraulic system comprising a metallic bellows mounted within a chamber, the open end of said bellows coinciding with the open end of said chamber, means for applying force from said lever system to said bellows, a second metallic bellows similarly mounted within a second chamber, said second chamber being in communication with said first chamber, and means acted on by said second bellows for applying force to said load counterbalancing means, said first bellows and said second bellows being under equal tension when no load is on said scale and adapted to change shape in opposite directions upon the application of force thereto.

3. In a weighing scale, in combination, a load receiver, a lever system supporting said load receiver, hydraulic pressure creating means comprising a metallic bellows mounted within a chamber, a connection between said lever system and said metallic bellows for applying force to said bellows in response to loads placed upon said load receiver, a second metallic bellows mounted within a second chamber, the spaces between the exterior walls of said first and second bellows and the interior of said first and second chambers respectively, being in communication and filled with hydraulic force transmitting fluid, load counterbalancing mechanism and means operatively connecting said second metallic bellows to said load counterbalancing mechanism for applying force transmitted to said second metallic bellows from said first metallic bellows to said load counterbalancing mechanism.

4. In a weighing scale, in combination, a load receiver, a lever system supporting said load receiver, hydraulic pressure creating means comprising a metallic bellows mounted within a chamber, a connection between said lever system and said metallic bellows for applying force to said bellows in response to loads placed upon said load receiver, a second metallic bellows mounted within a second chamber, the spaces between the exterior walls of said first and second bellows and the interior of said first and second chambers respectively, being in communication and filled with hydraulic force transmitting fluid, load counterbalancing mechanism and means operatively connecting said second metallic bellows to said load counterbalancing mechanism for applying force transmitted to said second metallic bellows from said first metallic bellows to said load counterbalancing mechanism, said first metallic bellows and said second metallic bellows being adjusted under equal tension when no load is on said scale and being adapted to change shape in opposite directions under force applied to said first bellows by said lever system and transmitted to said second bellows.

ROBERT S. BOHANNAN.